United States Patent [19]
Wuhrer

[11] 3,926,647
[45] Dec. 16, 1975

[54] PROCESS FOR THE PRODUCTION OF SYNTHETIC WOLLASTONITE AND DIOPSIDE
[75] Inventor: Josef Wuhrer, Wulfrath, Germany
[73] Assignee: Rheinische Kalksteinwerke GmbH, Germany
[22] Filed: Aug. 2, 1973
[21] Appl. No.: 384,923

Related U.S. Application Data
[63] Continuation-in-part of Ser. No. 102,895, Dec. 30, 1970, abandoned.

[30] Foreign Application Priority Data
Aug. 2, 1972  Germany............................ 2237906

[52] U.S. Cl. .................. 106/39.5; 106/61; 106/63; 106/69; 106/73.5; 423/331
[51] Int. Cl.² ........................................ C04B 35/16
[58] Field of Search ............ 106/39.5, 73.5, 45, 58, 106/61, 69, 63; 423/331

[56] References Cited
UNITED STATES PATENTS
2,621,131  12/1952  Lathe.................................. 106/58
3,381,064  4/1968  Yamaguchi et al................... 263/53
3,458,331  7/1969  Kroyer................................. 106/45
3,520,705  7/1970  Shido et al........................... 106/45

OTHER PUBLICATIONS
Clark, C. B., "X-Ray Diffraction Data For Compounds In The System CaO-MgO-SiO₂," J. Amer. Cer. Soc. 29 (1), 1946, pp. 25–27.

Primary Examiner—Allen B. Curtis
Assistant Examiner—Thomas A. Waltz
Attorney, Agent, or Firm—Fisher, Christen & Sabol

[57] ABSTRACT

Synthetic wollastonite is produced by sintering a mixture of silica and calcium oxide, and synthetic diopside or a mixture thereof with synthetic wollastonite is produced by sintering a mixture of silica, calcium oxide and up to an equimolar proportion, based on the calcium oxide, of magnesium oxide. When the CaO:MgO mole ratio is 1:1, synthetic diopside is produced. In all cases, silica is used in an amount of from 4 to 15%, and preferably from 5 to 10% in excess of the stoichiometric amount necessary to obtain the desired product.

13 Claims, No Drawings

PROCESS FOR THE PRODUCTION OF SYNTHETIC WOLLASTONITE AND DIOPSIDE

CROSS-REFERENCE TO RELATED APPLICATION

This application is a continuation-in-part of application Ser. No. 102,895 filed Dec. 30, 1970, now abandoned.

BACKGROUND OF THE INVENTION

1. Field of the Invention

The present invention relates to the production of synthetic materials for use in ceramics. More particularly, the present invention concerns the production of synthetic wollastonite ($CaOSiO_2$), synthetic diopside ($CaMgSi_2O_6$) and mixtures thereof by sintering silica admixed with calcium oxide or a mixture of calcium oxide and magnesium oxide.

In the production of ceramic products, for example of fine ceramics (whitewear) and industrial ceramics, monocalcium silicate ($CaOSiO_2$) is increasingly being used, especially in the form of natural wollastonite. This calcium silicate does not release chemically bound water in the course of the drying and firing process, so that one can increase the firing speed without any need to fear the formation of cracks. The shrinkage of the blanks during drying and also during firing is considerably lower than that of other ceramic materials. It is possible to fire the products smoothly in one step without the need for an initial firing after application of the glaze. The content of wollastonite in the ceramic raw mass may range up to 70% by weight and more. The use of wollastonite decreases the so-called swelling of the ceramic body and it represents an excellent glaze carrier due to its high calcium content. Despite these obvious advantages, heretofore the high price of the natural material, caused by the relatively rare occurrence of the natural mineral in quantities worth exploiting and of sufficiently high quality, has militated against a broader use of wollastonite.

Diopside is the silicate of calcium and magnesium and is also a valuable raw material for the ceramic industry. Naturally occurring diopside is a monoclinic pyroxene and ideally consists of the silicate of calcium and magnesium $CaMgSi_2O_6$. Commonly, however, the diopside contains a variable content of $FeSi_2O_6$ in addition thereto and is thus not desirable for ceramic purposes. Moreover, diopside is not found in large quantities in nature, occurring usually only in small quantities in company with other ceramic minerals.

2. Description of the Prior Art

Many experiments have been conducted in an effort to produce wollastonite synthetically from its basic substances or from suitable waste materials by fusion. Among the processes which have become known are those which produce the wollastonite synthetically through a solid body reaction by sintering, or by melting the base substances monocalcium silicate such as in lime or limestone, and quartz sand or other substances containing silicic acid. Generally, the starting materials are mixed in the $CaO:SiO_2$ mole ratio of 1:1, are sintered or rendered molten at a high temperature and subsequently crystallized through prolonged annealing at temperatures around 1100°C.

In the known processes for producing synthetic wollastonite by sintering the basic substances CaO and $SiO_2$, the starting materials must be extremely finely ground if the wollastonite is to be obtained at reasonable temperatures and sintering times. These methods have not proved to be economical, however, because the reaction time for complete conversion is too lengthy and because if the reaction time is shortened, the product contains substantial amounts of dicalcium silicate as an intermediate product, whereby it is unfit for the ceramic industry. For this reason, it has already been proposed that synthetic wollastonite be prepared from the starting materials via the hydrosilicates which under certain circumstances are produced in the course of hydrothermal reaction of lime with silicic acid. The hydrosilicates can then be dehydrated to wollastonite.

Furthermore, a process has become known according to which pseudowollastonite is produced by sintering a lime containing and silicic acid containing mixture in a rotary kiln. At the same time, the silicic acid is used in an excess of up to a molratio of 1:2 and, in order to facilitate the reaction, two groups of mixtures of certain fluxing agents are added, each at certain minimum quantities, or else raw materials containing corresponding quantities of impurities are used, after it turned out that pseudowollastonite developed without fluxing agent addition only at 40%, while dicalcium silicate likewise occurred at 40% in the end product. In order to control this process, it is further considered necessary to compact the raw mixture prior to its delivery into the rotary kiln, since only in this manner could the burning process allegedly be controlled with a view to maintaining of the required temperature range, the reaction time and especially to avoid formation of deposits in the kiln.

However, it has been found that the addition of considerable quantities of fluxing agents for the purpose of enlarging the permissible temperature range between the beginning of sintering and the melt not only decreases the quality of the product, especially the possibility of its use in the ceramic industry, but that it is exactly these fluxing agents which favor very strongly an undesirable formation of deposits. In addition, the compacting of the raw mix represents an additional, expensive operating step. It has also been known that mixtures of burned lime containing material and silicic acid cannot be compacted well, so that the use of binders, possibly water, is required, which in turn necessitates an increased consumption of energy during burning.

Heretofore in the ceramics industry it has been known to use a mixture of wollastonite as a calcium silicate source, and a basic substance similar to enstatite as a magnesium silicate source, to approximate the naturally occurring diopside. The enstatite-like substance is conventionally obtained by firing of steatite, a coarse, massive or granular variety of talc and thus an acid metasilicate of magnesium. Steatite has the approximate composition $3MgO.4SiO_2.H_2O$ to $4MgO.5SiO_2.H_2O$ and in addition contains from 5 to 15 percent by weight impurities.

There have therefore remained the tasks of developing economic and qualitative processes for the production of synthetic wollastonite and diopside.

It is therefore an object of the present invention to provide a novel process for the production of synthetic wollastonite, synthetic diopside and mixtures thereof.

It is another object of the present invention to provide such a process which is economical and which overcomes the disadvantages of prior art processes.

It is still another object of the present invention to provide such a process for producing synthetic materials which are highly advantageous over prior art approximations of the naturally occurring minerals in the ceramics industry.

It is a further object of the present invention to provide such a process using raw mixtures free from fluxing agents and comprising calcium oxide and/or calcium oxide containing materials, and silica, and/or silica containing materials (with or without magnesium oxide containing materials) without the necessity for first compacting the raw mixture, i.e., to achieve sintering with direct use of the raw mix.

It is a still further object of the present invention to provide such a process which is particularly suited for operation in a rotary kiln.

Other objects and advantages of the present invention will become apparent from a consideration of the following specification and claims. For a more comprehensive disclosure of the nature, objects and advantages of the invention, reference is made to the following detailed description of the present invention.

SUMMARY OF THE INVENTION

It has now surprisingly been found that synthetic wollastonite can be produced economically in a quality for the ceramic industry by the technologically simple sintering of a mixture of the starting materials lime or limestone (calcium carbonate) and silica, the silica being used in an excess of at least 4% calculated on the stoichiometric amount of silica necessary to produce synthetic wollastonite. It has also been found that a mixture of synthetic wollastonite and diopside which is especially valuable in the ceramics industry or diopside alone may be prepared if the lime or limestone reactant is replaced by magnesium oxide or magnesite (magnesium carbonate) in an amount up to a mole ratio of CaO to MgO of 1:1. When the mole ratio of CaO to MgO is 1:1, diopside alone is produced. The process of this embodiment can be conducted with mixtures of the carbonates and/or oxides of calcium and magnesium used as starting materials. In addition, a magnesitic limestone, dolomite or calcined dolomite may be used as raw materials.

The raw materials of the present invention are selected and used so that the impurities of the raw mix consist essentially of aluminum oxide and iron oxide and amount to a total of less than 1.0% in the end product, and the alkaline impurities of the raw mix amount to less than 0.1% related to the end product. The raw mix of the present invention is sintered as is, i.e., the mix is free from fluxing agents and is sintered without prior compacting, e.g., briquetting or pelletizing.

The required 4% excess of silica is calculated on the equivalent amount of silica with reference to the total CaO or CaO and MgO content, taking into consideration the impurities that react at sintering temperatures with the basic oxides or with the silica. For example, in the calculation of excess silica in the production of wollastonite, this is based on the amount of silica equivalent to the amount of CaO, and impurities of the CaO or of the calcium carbonate or limestone must be taken into consideration, for instance MgO and $Al_2O_3$, because in the sintering of MgO, magnesium silicate may be formed, and burning of aluminum oxide leads to formation of calcium aluminate.

It has been unexpectedly demonstrated that even with such slight excess of silica in the reaction mixture, there is a substantial shortening of the sintering time and that as a result, the formation of undesirable dicalcium silicate or dimagnesium silicate is reduced to the extent that even with the shortened sintering time neither of these silicates is present in the final product. The excess silica is present in the final product as cristobalite or a mixture thereof with quartz and does not harmfully affect the use of the wollastonite or diopside in ceramic manufacture, even if the mixture contains up to 4% or more cristobalite.

The excess of silica used according to the present invention may be up to about 15% and depends essentially upon the intended use or the desired composition of the ceramic material or mixture. A 15% excess of silica provides a little more than 7.5% cristobalite in the final product. It is advantageous, however, to keep the silica excess at the lower end of the range because cristobalite, insofar as it is needed for the ceramic material, can be produced more economically by using quartz alone, and a high excess therefore makes unnecessary demands on the heat balance in the production of wollastonite, diopside or wollastonite-diopside mixture. On the other hand, an excess of more than 4% of silica still further speeds up formation of the synthetic ceramic material so that it is advantageous and preferred to use an excess of silica between 5 and 10%.

DESCRIPTION OF THE PREFERRED EMBODIMENTS

The process of the invention can be conducted in any suitable apparatus such as a cylindrical rotary kiln. As seen in Examples 1–7, in the small laboratory kiln that was used therein, throughput times were about 1½ hours, and the maximum sintering temperature was about 1420°C. Depending on kiln size, throughput times of from 1 to 4 hours are satisfactory at sintering temperatures between 1200° and 1500°C. and this is also somewhat dependent upon the purity of the starting materials. When using materials such as those in Examples 1–7 and 9 wherein impurities in the form of iron oxides and/or aluminum oxides total well below 1.0% by weight, the sintering temperature is preferably within the range of 1300° to 1500°C. However, when the materials contain relatively higher quantities (closer to 1.0% by weight) of said impurities, a sintering temperature as low as 1200°C. can be used. When, on the other hand, starting materials of substantial purity are used, a sintering temperature as high as 1500°C. may be desirable or necessary.

Further with regard to the sintering temperature, when considering the overall process wherein synthetic wollastonite, synthetic diopside or a mixture thereof can be produced, the operable temperature range is from about 1200° to 1500°C. and preferably from 1300° to 1500°C. When producing synthetic wollastonite alone, the operable temperature range is from about 1350° to 1500°C. and preferably from 1400° to 1500°C. When, on the other hand, diopside alone is produced, the operable temperature range is from about 1200° to 1360°C. and preferably from 1300° to 1360°C. By way of explanation and as a comparison, the melting point of pure wollastonite is 1544°C. and the melting point of pure diopside is 1392°C. The melting point of the eutectic mixture containing about 40% wollastonite and 60% diopside is 1358°C. The sintering temperature used for producing mixtures of wollastonite and diopside will therefore be lower within the above-described overall range the closer one approaches, from one side or the other, the eutectic mixture to assure remaining below the melting point.

The throughput times will also vary depending on the type of rotary kiln used, and particularly upon presence or absence of a preheater and the angle of inclination, number of revolutions per minute and length of the kiln tube. Residence time in the sintering zone of the kiln, and thus the actual sintering time of the materials will generally be less than the above-described throughput times. As seen in Example 1, with a throughput time of 90 minutes, residence time in the sintering zone thereof was 30 minutes. The essential consideration is that the reaction mixture be completely or at least substantially completely sintered and that there be complete or substantially complete conversion of the starting materials to the desired synthetic product. Thus, the product will contain little or no free calcium oxide and this can be determined easily by analysis. It is also important that the reaction product contain little or no dicalcium silicate and this will be accomplished by the process of the present invention. It is, however, difficult to make an analytic determination of this factor since dicalcium silicate is very difficult to identify by known analytical procedures. Based on the purity and particle size of the starting materials and the type of apparatus used, the optimum sintering times for a given sintering temperature can be calculated or closely estimated by one skilled in the art.

In the production of synthetic wollastonite, the process of the present invention offers the advantages that the starting materials need not be used in an excessively fine particle size, the reaction time is substantially shortened and a product free of dicalcium silicate is obtained. When producing diopside or a wollastonite-diopside mixture, in addition to the above advantages, the product is free from dimagnesium silicate and contains no free MgO.

While in the specific examples the particle size ranges from less than 0.032 mm. up to 0.2 mm., the process of the present invention is operable with small amounts of particle sizes up to about 0.5 mm. Preferably, the particle size of these small amounts should not exceed about 0.4 mm. Most preferably, grain sizes above 0.2 mm. and up to about 0.5 mm. should not be used except in amounts up to about 10% by weight of the grain mixture. There is no theoretical lower limit to the particle size.

Typical practice of the invention is exemplified in the following specific examples in which details are given by way of illustration only and are not to be construed as limiting the invention. In the specific examples and throughout the specification and claims, all properties and percentages are by weight unless otherwise defined.

EXAMPLE 1

A laboratory rotary kiln 16 meters in length and 0.8 meters in internal diameter, without preheater or cooler, was charged with a mixture that comprised 61% by weight ground limestone and 39% by weight ground quartz. On the basis of the analyses set forth below, the experiment was conducted with an 8% excess of $SiO_2$ which corresponded to a theoretical 4.2% cristobalite content in the finished product.

The raw materials had the following composition:

Table 1

|  | Limestone (%) | Quartz (%) |
|---|---|---|
| Moisture | 0.27 | — |
| Combustion loss | 43.30 | — |
| CaO | 54.51 | — |
| MgO | 0.56 | — |
| $SiO_2$ | 0.93 | 99.76 |
| $Al_2O_3$ | 0.23 | 0.20 |
| $Fe_2O_3$ | 0.20 | 0.04 |

The particle size analysis yielded the following size distribution:

Table 2

| 0.2 to 0.09 mm | = | 4.5% |
|---|---|---|
| 0.09 to 0.063 mm | = | 10.6% |
| 0.063 to 0.04 mm | = | 15.0% |
| 0.04 to 0.032 mm | = | 16.8% |
| 0.032 mm | = | 53.1% |

The mixture was charged dry into the kiln and the throughput time was 90 minutes. Residence time in the actual sintering zone was about 30 minutes. The material temperature in the sintering zone was 1380° to 1420°C. The X-ray analysis of the sintered product showed a 95% wollastonite content, and about 5% cristobalite.

EXAMPLE 2

Example 1 was repeated with the exception that the stoichiometric amount of silica (no excess) was used. The product consisted of wollastonite and about 10% dicalcium silicate as well as a small amount of cristobalite and was not suitable for use in ceramics.

EXAMPLE 3

A crude particulate material was produced by grinding together 51.2% by weight limestone, 9.0% by weight magnesite and 39.8% by weight quartz sand, having the following particle size distribution:

Table 3

| 0.2 to 0.09 mm | = | 6.3% |
|---|---|---|
| 0.09 to 0.063 mm | = | 13.8% |
| 0.063 to 0.04 mm | = | 19.0% |
| Less than 0.04 mm | = | 60.9% |

The raw materials used had the following composition:

Table 4

|  | Crude Magnesite (%) | Limestone (%) | Quartz (%) |
|---|---|---|---|
| Moisture | 0 | 0.27 | 0.04 |
| Combustion loss | 51.07 | 43.30 | — |
| CaO | 0.56 | 54.51 | — |
| MgO | 46.97 | 0.56 | — |
| $SiO_2$ | 0.89 | 0.93 | 99.86 |
| $Al_2O_3$ | 0.08 | 0.23 | 0.10 |
| $Fe_2O_3$ | 0.28 | 0.20 | — |

The crude particulate material was sintered in a laboratory rotary kiln of Example 1 at a material temperature of 1340° to 1390°C. in the sintering zone. Throughput time was 80 to 90 minutes.

The product according to X-ray analysis consisted of approximately 65% wollastonite, 30% diopside and about 5% cristobalite. The product withstood the autoclave test (5 atm. vapor pressure for 3 hours) so that the product was suitable for use in ceramics.

In the preparation of the crude particulate material, 10% more quartz sand was used than is theoretically needed for the reaction to wollastonite and diopside and there was a calculated 5% by weight free $SiO_2$ in the product.

EXAMPLE 4

Example 3 was repeated with the exception that the stoichiometric amount of silica (no excess of quartz sand) was used. The product, in addition to wollastonite, diopside and small amounts of cristobalite, contained about 12% dicalcium silicate, did not withstand the autoclave test and was not suitable for use in ceramics.

EXAMPLE 5

A crude particulate material was prepared, comprising 58% by weight crude dolomite and 42% by weight quartz sand, with the following particle size distribution:

Table 5

| | | |
|---|---|---|
| 0.2 to 0.09 mm | = | 4.0% |
| 0.09 to 0.063 mm | = | 13.8% |
| 0.063 to 0.04 mm | = | 15.1% |
| 0.04 to 0.032 mm | = | 18.6% |
| Less than 0.032 mm | = | 48.5% |

The raw materials that were used had the following chemical composition:

Table 6

| | Crude Dolomite (%) | Quartz Sand (%) |
|---|---|---|
| Moisture | 0 | 0.04 |
| Combusion loss | 47.30 | — |
| CaO | 31.51 | — |
| MgO | 20.71 | — |
| $SiO_2$ | 0.19 | 99.86 |
| $Al_2O_3$ | 0.09 | 0.10 |
| $Fe_2O_3$ | 0.20 | — |

The crude particulate material was sintered in the laboratory rotary kiln of Example 1 at a material temperature of 1260° to 1300°C. in the sintering zone. The throughput time of the material in the kiln was about 80 minutes.

The product according to X-ray examination consisted of about 90% diopside, 5% wollastonite and about 5% cristobalite. The product withstood the autoclave test (5 atm. vapor pressure for 3 hours).

In the preparation of the crude particulate product, 12% more quartz sand was used than that stoichiometrically required for conversion of the starting materials to diopside and wollastonite. Theoretically there was a remaining $SiO_2$ fraction in the product of 6.2% by weight.

EXAMPLE 6

Example 5 was repeated with the exception that the stoichiometric amount of silica (no excess of quartz sand) was used. The product, which according to X-ray analysis contained dicalcium silicate and $2CaO.MgO.2SiO_2$ (Akermanit) in addition to diopside and wollastonite, did not withstand the autoclave test and was therefore not suitable for use in ceramics.

In a particularly preferred embodiment of the present invention with regard to the production of the synthetic materials in a rotary kiln, it has been found that the same can be achieved if limestone and/or burned (calcined) lime is used as the calcium oxide containing raw material and if ground quartz sand, for example, is used as the silica containing raw material in an excess of from 5 to 10% related to the stoichiometric quantity of silica (with or without a magnesium oxide containing raw material) whereby the impurities of the raw mix consist essentially of aluminum oxide and iron oxide and amount to a total of less than 1.0% in relation to the end product, and the alkaline impurities of the raw mix amount to less than 0.1% related to the end product, and whenever this raw mix is charged without prior briketting or pelletizing into the rotary kiln without addition of fluxing agents. Surprisingly, it has been found that these technical measures permit a smooth operation of the kiln, i.e., no disturbing deposits are formed despite the charge of the starting material in the form of a loose, raw mix, and that by way of this process a synthetic material can be obtained which has a free lime content of less than 0.1%, in exceptional cases even less than 0.06%. Dicalcium silicate cannot be found in the burned product either by way of X-ray or by microscopic examination.

When directly charging the raw mix into the rotary kiln, it will be effective to use a calcium oxide containing raw material, the calcium oxide component of which contains at least 40% of burned calcium oxide, in the case of which, therefore, less than 60% of the calcium oxide is provided in the form of the carbonate. As a result, the tendency that in the area of the composition of the calcium carbonate in the rotary kiln during the formation of carbon dioxide, the relatively fine, raw mix will bubble, float and gush and, thus, reach the sintering zone in an unevenly prepared thermal state is avoided to a large extent. Such a tendency would lead to an incompletely reacted product still containing $C_2S$— and free lime. The process is even more favorable with regard to the flow of the raw mix when the calcium oxide component consists of 80% CaO and it can be accomplished best with a CaO content of 90% and more. Furthermore, it will be necessary to use sintering temperatures which lie in the preferred ranges noted hereinbefore, e.g., above 1400°C. when producing wollastonite and above 1300°C. when producing diopside, and also to use a raw mix of a grain size which contains at least 90% of the grains having a size of less than 0.09 mm. Lower burning temperatures and larger grain sizes would require too long a reaction time so that in that case the burned product would contain free lime in addition to dicalcium silicates.

The low content of impurities in the raw mix of this embodiment makes it imperative to use the preferred sintering temperatures noted above. Aluminum oxide and iron oxide should be present in the raw mix in such low quantities that they are contained in a total amount of less than 1%, preferably less than 0.8% in the end product. Higher contents of these impurities and addition of fluxing agents lead to undesirably increased proportions of glassy materials and undesirably strong deposits on the lining of the kiln. Also, alkalis especially should not be present at all or only in traces in the raw mix, so that in the end product less than 0.1% and, for practical purposes, less than 0.05% are present. Furthermore, in order to produce a wollastonite with as high as possible reflectance, it will be advantageous if the portion of iron oxide in the end product amounts to less than 0.25%, preferably less than 0.15%.

When carrying out the process of this embodiment, a product clinker in a form similar to that obtained in cement production develops from the raw mix in the sintering zone. The clinker is cooled in the customary manner, e.g., in a cooling drum, and is then ground to the required fineness.

The process according to this embodiment of the invention is explained on the basis of the following examples.

EXAMPLE 8

Burned (calcined) lump lime and quartz sand of a grain size of 0–5 mm. were separately finely ground so that the residue on an 88 $\mu$ sieve amounted to about 4–5% by weight. The chemical compositions of the two mixes of raw materials are shown in the following table. Subsequently, these two starting substances were fed, by way of a supply silo and metering conveying scales in a weight ratio of 48.1% burned lime and 51.9% quartz, in charges to an intensively operating turbulent mixer having a holding capacity of 2 tons. 962 kg burned lime and 1038 kg of finely ground quartz were added to the mixer and were homogenized for ten minutes. With this stated mixing ratio, an excess by computation of $SiO_2$ of 4.3% develops in the product. This raw mix was charged by way of a supply silo through a sluice and a metering screw into a rotary kiln without preheater of 50 meters in length and 2.1 meters of inside diameter within the lining. This rotary kiln was equipped with a cooling drum and heated with a fuel oil, the temperature of the material in the sintering zone was 1420°C. and the output was about 8.2 tons of sintered wollastonite per hour. During a continuous operation of four weeks, no difficulties with deposits or particular formation of rings could be found, and production continued evenly. The sintered product was very homogeneous, after fine grinding it has a light gray color tone, and an X-ray investigation revealed pseudo-wollastonite ($\alpha.CaO.SiO_2$) and quantities of cristobalite and an amount of quartz which could just barely be detected. Dicalcium silicate could not be found either during the X-ray investigation or by means of a microscope. The chemically determined content of free CaO (free lime) amounted to 0.05 ± 0.02% by weight. The chemical composition is shown in the last column of the following table. The stated content of free $SiO_2$ was computed.

Table 7

|  | Burned lime, finely ground (% by weight) | Quartz sand finely ground (% by weight) | Sintered wollastonite (% by weight) |
| --- | --- | --- | --- |
| annealing loss | 2.69 | 0.16 | 0.25 |
| CaO | 93.11 |  | 44.88 |
| MgO | 1.12 |  | 0.60 |
| $SiO_2$ | 2.03 | 99.36 | 53.58 |
| $SO_3$ | 0.07 |  | 0.01 |
| $Fe_2O_3$ | 0.35 | 0.12 | 0.28 |
| $Al_2O_3$ | 0.23 | 0.16 | 0.17 |
| $Mn_2O_3$ | 0.08 |  | 0.04 |
| $K_2O+Na_2O$ | 0.005 | 0.000 | 0.00 |
| Total | 99.685 | 99.80 | 99.81 |
| CaO-free |  |  | 0.05± 0.02 |
| $SiO_2$-free (computed) |  |  | 4.40 |

EXAMPLE 9

Small lumps of burned lime produced from a limestone having a low iron content and a quartz sand having a low iron content of a grain size of 0–2 mm. were finely ground in a mill with a corundum casing and corundum grinding bodies into a raw mix having a residue of 3–4% on an 88 $\mu$ sieve. The chemical analyses of the burned lump lime and of the quartz sand are shown in the following table. Charging of the burned lime and of the quartz sand into the mill was accomplished by a conveying scale at the weight ratio of 46.9% of burned lime and 53.1% of quartz sand. This resulted in a computed excess of $SiO_2$ of 4.4% in the sintered wollastonite product. The raw mix produced in this way was charged evenly by way of a sluice and oppositely directed screws, after homogenizing in a supply silo, by way of a supply bunker for the kiln into the rotary kiln system described in Example 8. With this wollastonite raw mix and its considerably low content of $Fe_2O_3$ and $Al_2O_3$ a temperature of 1480°C. was reached in the sintering zone and the output was 8.0 tons of sintered wollastonite per hour. The sintering process in the kiln continued for several weeks without any difficulties. The draft conditions and temperatures in the kiln and the performance of said kiln were very uniform. No difficulties occurred due to formation of deposits or even of rings. The product in its chemical composition and in its degree of sintering was very uniform and was of a slightly greenish sparkling color. The wollastonite mix produced had a high degree of whiteness. It contained no detectable $C_2S$, the content of free lime was at 0.04 ± 0.02 and the computed content of free $SiO_2$ amounted to 4.5%. The chemical composition is shown in the last column of the following table.

Table 8

|  | Burned lime, small lumps (% by weight) | Quartz sand, 0 – 2 mm. (% by weight) | Sintered wollastonite (% by weight) |
| --- | --- | --- | --- |
| Annealing loss | 2.16 | 0.28 | 0.23 |
| CaO | 96.70 |  | 45.12 |
| MgO | 0.61 |  | 0.40 |
| $SiO_2$ | 0.20 | 99.43 | 53.79 |
| $SO_3$ | 0.00 |  | 0.02 |
| $Fe_2O_3$ | 0.10 | 0.06 | 0.09 |
| $Al_2O_3$ | 0.22 | 0.12 | 0.17 |
| $Mn_2O_3$ | 0.00 | 0.00 | 0.00 |
| $K_2O+Na_2O$ | 0.00 | 0.00 | 0.00 |
| Total | 99.99 | 99.89 | 99.82 |
| CaO-free |  |  | 0.04 |
| $SiO_2$-free (computed) |  |  | 4.50 |

What is claimed is:

1. A process for the production of a synthetic material selected from the group consisting of wollastonite, diopside and mixtures thereof which comprises preparing a mixture of grains having a maximum particle size of about 0.5 mm. with not more than about 10% by weight of said grains having a particle size above 0.2 mm. of basic materials consisting essentially of a member selected from the group consisting of calcium oxide and a mixture of calcium oxide with up to an equimolar proportion of magnesium oxide, and silica in an amount of from 4 to 15% by weight in excess of the stoichiometric amount necessary to produce said synthetic material, the impurities in said basic materials consisting essentially of aluminum oxide and iron oxide in a total amount of less than 1.0% and alkalis in an amount of less than 0.1%, both related to the produced synthetic material, and sintering said mixture free from fluxing agents and without prior compacting at a temperature of from about 1200° to 1500°C. for a time sufficient to substantially completely sinter and convert said basic materials to said synthetic material substantially free from free calcium oxide, free magnesium oxide, dicalcium silicate and dimagnesium silicate.

2. The process according to claim 1 wherein the silica is used in an amount of from 5 to 10% in excess of said stoichiometric amount.

3. The process according to claim 1 wherein the sintering is conducted at a temperature between 1300° and 1500°C.

4. The process according to claim 1 wherein the synthetic material is wollastonite, the silica is provided in the form of quartz and the calcium oxide is provided in the form of limestone.

5. The process according to claim 1 wherein the synthetic material is a mixture of wollastonite and diopside, the silica is provided in the form of quartz, the calcium oxide is provided in the form of limestone and the magnesium oxide is provided in the form of magnesite.

6. The process according to claim 1 wherein the synthetic material is a mixture of wollastonite and diopside, the silica is provided in the form of quartz and the calcium oxide and magnesium oxide are provided in the form of dolomite.

7. The process according to claim 1 wherein calcium oxide and magnesium oxide are used in substantially equimolar proportions and the synthetic material is diopside.

8. A process for the production of a synthetic material selected from the group consisting of wollastonite, diopside and mixtures thereof which comprises preparing a basic material grain mixture consisting essentially of a silica containing material and a member selected from the group consisting of a calcium oxide containing material and a mixture thereof with up to an equimolar proportion of a magnesium oxide containing material whereby the silica in said silica containing material is provided in an amount of from 5 to 10% in excess of the stoichiometric amount necessary to produce said synthetic material, the calcium oxide containing material is selected from the group consisting of limestone and calcined lime, the impurities in said basic materials consist essentially of aluminum oxide and iron oxide in a total amount of less than 1% and alkalis in an amount of less than 0.1%, both related to the produced synthetic material and at least 90% of said grains have a particle size of less than 0.09 mm., and sintering said mixture free from fluxing agents and without prior compaction in a rotary kiln at a temperature of from 1300° to 1500°C. for a time sufficient to substantially completely sinter and convert said basic materials to said synthetic material substantially free from free calcium oxide, free magnesium oxide, dicalcium silicate and dimagnesium silicate.

9. The process according to claim 8 wherein the total amount of iron oxide and aluminum oxide impurities is less than 0.8% and the total amount of alkali is less than 0.05% related to the produced synthetic wollastonite.

10. The process according to claim 8 wherein the synthetic material is wollastonite, the basic material grain mixture consists essentially of said silica containing material and said calcium oxide containing material and said sintering is conducted at a temperature above 1400°C.

11. The process according to claim 10 wherein the total amount of iron oxide impurities is less than 0.25% related to the produced synthetic wollastonite.

12. The process according to claim 8 wherein the calcium oxide containing material consists of at least 40% of calcined lime related to the total calcium oxide content.

13. The process according to claim 8 wherein the calcium oxide containing material consists of at least 80% of calcined lime related to the total calcium oxide content.

* * * * *